March 6, 1956  J. H. TURNER  2,737,397
COMBINATION SLED AND PORTABLE SHELTER
Filed March 20, 1953
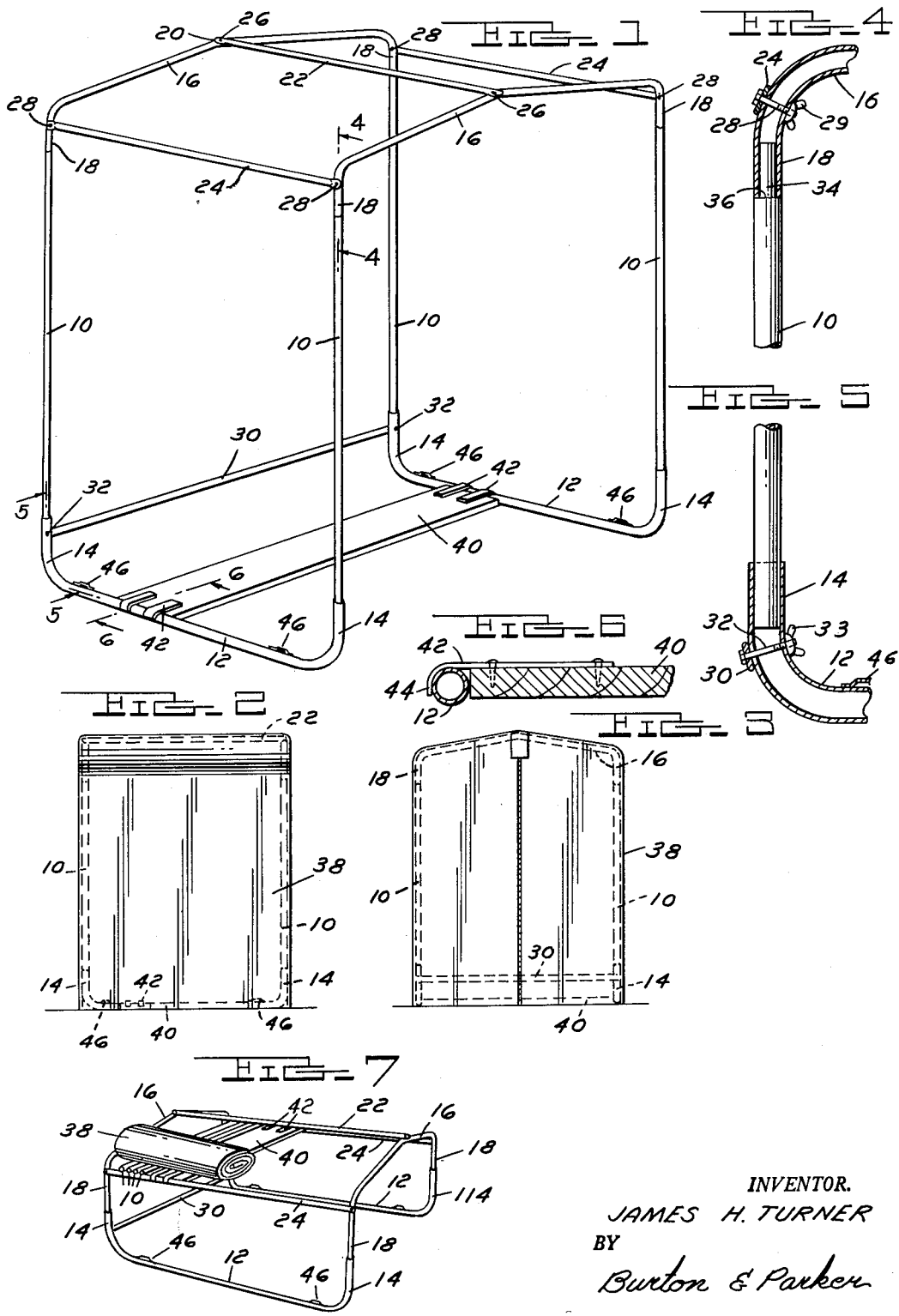
INVENTOR.
JAMES H. TURNER
BY
Burton & Parker
ATTORNEYS

United States Patent Office 2,737,397
Patented Mar. 6, 1956

2,737,397

COMBINATION SLED AND PORTABLE SHELTER

James H. Turner, Detroit, Mich.

Application March 20, 1953, Serial No. 343,603

2 Claims. (Cl. 280—12)

This invention relates to an improved shelter framework.

More particularly, it relates to an improved shelter framework which may be rearranged so as to serve the purpose of a sled to be used to transport the framework together with additional gear.

An object is to provide a shelter framework which may be readily disassembled for packing and transportation and which when disassembled is capable of being stored and transported in the trunk compartment of a conventional automobile.

Another object is to provide a shelter framework of the character described which may be quickly erected to serve as the framework for a structure and without the necessity of employing any special tools or the like.

The framework is so formed and arranged that it may be assembled not only to build up the framework of a shelter but also to provide a sled which may be drawn over snow or ice in any suitable manner as by hitching behind an automobile and which sled is sufficiently sturdy and commodious to transport whatever other material may be required to complete the shelter or whatever gear may be desired to be transported.

A further object is to provide a shelter framework of the character described to make a shelter for a fisherman in fishing through ice. Such framework together with the canvas which surrounds same may be arranged in a bundle sufficiently small and compact to be transported in the trunk compartment of a motor vehicle. The framework together with the surrounding enclosure will constitute when assembled a suitable shelter for winter use on the ice. It also may be set up in such a manner that it will serve as a sled to transport the shelter itself and any other desired gear over the ice.

Other objects, advantages and meritorious features will appear from the following description, claims and accompanying drawing, wherein:

Fig. 1 is a perspective of the framework of the invention assembled to serve as the framework of a shelter;

Fig. 2 is a side elevation of such framework provided with a shelter cover and wherein the framework is shown in dotted outline;

Fig. 3 is a front elevation of the framework provided with a shelter cover and wherein the framework is illustrated in dotted outline;

Fig. 4 is a section of a fragment of the juncture of an upright frame member with a roof member taken on the line 4—4 of Fig. 1;

Fig. 5 is a section of a fragment of the juncture of the lower end of an upright member with the base or foundation of the member taken on the line 5—5 of Figure 1;

Fig. 6 is a section of a fragment taken on line 6—6 of one end of the floor-board showing its support upon the base of the frame;

Fig. 7 is a perspective of the framework rearranged to serve as a sled instead of the framework of a shelter.

As hereinabove stated, this framework is designed to serve the purpose of a demountable frame which may be used to support a canvas cover and constituting therewith a winter shelter. It is particularly designed for the use of fishermen in fishing through the ice, but obviously it may serve many other purposes. It is so designed that the framework when disassembled may be packaged within a small space and transported within the trunk compartment of an automobile.

It is further so designed that when erected to serve as the framework of a shelter, a canvas cover prepared to fit the same may be placed thereover and the entire structure will then serve as an enclosure for fishermen or someone else desiring to use it.

It is also so designed that the frame sections may not only be assembled as a frame for a shelter but may be so assembled as to make up a sled upon which the cover and other accessories for use might readily be transported.

The structure is formed of simple structural tubular parts and can be quickly and easily assembled or disassembled. It is light in weight and economical. It constitutes rigid structures whether in the form of a shelter or sled.

The structure assembly as shown in Fig. 1, comprises four upright rod-like or tubular leg sections each indicated by the numeral 10. These sections are all similar. It further comprises two complementary similar base sections 12. These base sections are shown as of tubular formation. Each base section has its two ends bent upwardly as at 14 perpendicularly with respect to the base 12. The corners however are rounded as shown. There are also two similar complementary tubular roof sections 16. Each of these roof sections has its opposite ends 18 bent substantially perpendicularly with respect to the roof section itself. Each roof section slopes from a mid point 20 toward its two ends, as shown particularly in Figs. 1 and 3.

There are three cross frame sections associated with the roof section. One is a ridgepole section 22 and the other two are side sections 24. The ridgepole section 22 is flattened at its opposite ends and a bolt 26 is adapted to be extended through each end and through the roof section 16 to secure the ridgepole in place. This bolt may be of the wing nut type so that it can be readily unfastened and the ridge section removed for disassembly. Each side frame section 24 is shown as flattened at its opposite ends and provided with a bolt 28 extended therethrough and through an end 18 of the roof member so as to detachably secure the side frame sections 24 thereto, as shown particularly in Fig. 1. This is shown also in Fig. 4 at the upper corner. The bolt 28 is provided with a wing nut 29.

A transverse frame member 30 is provided. It extends between the upturned ends 14 of the two base members 12. It is detachably secured in place in the manner heretofore described in connection with the sections 22 and 24. A bolt 32 is extended through each end thereof and through the end sections 14 of the base member. Such bolt 32 is provided with a wing nut 33, as shown particularly in Fig. 5.

The opposite ends of the sections 10 are adapted to be received within the ends 14 and 18 of the base members 12 and the roof members 16, as shown in Fig. 4. Each leg section 10 has its upper end 34 of reduced diameter as compared with its lower end. The upper end is received within the roof section 16 and exhibits a shoulder 36 which seats against the end 18 of the roof section 16, as shown in Fig. 4. Due to the ends of the leg sections 10 being of different diameter, it is possible for the end 18 of a roof section 16 to be received within an end 15 of a base section 12 when the structure is assembled to form a sled, as shown in Fig. 7.

A canvas cover may be provided and so formed that it can be received over the framework as shown in Figs.

2 and 3. Such canvas cover is there indicated as 38. This canvas cover 38 is shown rolled up in Fig. 7.

A floor board 40 is provided as shown in Figs. 1 and 6. This floor board has at each end a pair of supports 42 which are curved as at 44 to be received over the base frame member 12 so as to be supported thereupon. A plurality of such floor boards 40 may be provided if desired. Each base member 12 may be provided with fittings or loops 46 welded thereto and adapted to receive snaps or tie members to secure the cover in place upon the frame.

In Fig. 7, the framework is shown as assembled to build up a sled. In this structure, the base members 12 constitute the runners of the sled. The top portion of the framework which consists of the complementary roof members 16 and the cross frame sections 22 and 24 are secured thereto and extend therebetween. It is assembled directly upon the base members 12. The ends 18 of the roof members 16 are telescoped into the ends 14 of the base members 12. The floor board 40 is then hooked over the frame members 24 and the leg sections 10 are placed thereover, as illustrated. They may be strapped together and the canvas cover may be supported thereupon. Other articles might be supported thereupon. Such sled may be provided with tow means adapted to connect it for assembly so as to be drawn by hand.

What I claim is:

1. A framework for a combination shelter and sled comprising a pair of complementary U-shaped tubular members the base portions of which curve at opposite ends into the legs forming runners for the sled or base members for the shelter, a strut extending between and detachably connected at opposite ends to one leg of each of said pair of U-shaped members spacing the members apart in substantially parallel relationship, a second pair of tubular U-shaped members the base portions of which curve at opposite ends to form legs, three struts connecting said second pair of U-shaped members together in spaced substantially parallel relationship, one of said three struts being an intermediate strut extending between and detachably connected to the base portions of said second pair of U-shaped members substantially midway between the ends thereof and the other two struts being side struts extending between the second pair of U-shaped members and detachably connected to the legs thereof, the base portions of the second pair of U-shaped members sloping from said intermediate strut toward the legs, the two tubular legs of each U-shaped member of one pair being adapted to telescope within the two tubular legs of a U-shaped member of the other pair to connect said two pairs of U-shaped members together with the second pair of U-shaped members extending between and bridging together the ends of the two U-shaped members of the first pair, four intermediate leg sections each adapted at one end to be telescopically coupled with the end of a leg of the first pair and adapted at the opposite end to be telescopically coupled with a leg of the U-shaped member of the second pair, and a platform element having hooks at opposite ends engageable over the base portions of the first pair of U-shaped members or the side struts of the second pair of U-shaped members.

2. A framework for a combination shelter and sled comprising a pair of complementary U-shaped tubular members the base portions of which curve at opposite ends into the legs forming runners for the sled or base members for the shelter, a strut extending between and detachably connected at opposite ends to one leg of each of said pair of U-shaped members spacing the members apart in substantially parallel relationship, a second pair of tubular U-shaped members the base portions of which curve at opposite ends to form legs, three struts connecting said second pair of U-shaped members together in spaced substantially parallel relationship, one of said three struts being an intermediate strut extending between and detachably connected to the base portions of said second pair of U-shaped members substantially midway between the ends thereof and the other two struts being side struts extending between the second pair of U-shaped members and detachably connected to the legs thereof, the base portions of the second pair of U-shaped members sloping from said intermediate strut toward the legs, the two tubular legs of each U-shaped member of one pair being adapted to telescope within the two tubular legs of a U-shaped member of the other pair to connect said two pairs of U-shaped members together with the second pair of U-shaped members extending between and bridging together the ends of the two U-shaped members of the first pair, and four intermediate leg sections each adapted at one end to be telescopically coupled with the end of a leg of the first pair and adapted at the opposite end to be telescopically coupled with a leg of the U-shaped member of the second pair.

References Cited in the file of this patent

UNITED STATES PATENTS

| | | |
|---|---|---|
| 2,464,884 | Noyes | Mar. 22, 1949 |
| 2,473,076 | Scheibner | June 14, 1949 |
| 2,511,452 | Anderson et al. | June 13, 1950 |
| 2,546,588 | Ellis | Mar. 27, 1951 |
| 2,632,454 | Skogen | Mar. 24, 1953 |

FOREIGN PATENTS

| | | |
|---|---|---|
| 85,530 | Germany | Feb. 20, 1896 |